(12) United States Patent
Maeda et al.

(10) Patent No.: US 8,932,746 B2
(45) Date of Patent: Jan. 13, 2015

(54) SEPARATOR FOR NON-AQUEOUS RECHARGEABLE LITHIUM BATTERY

(75) Inventors: Hideaki Maeda, Osaka (JP); Masaki Koike, Osaka (JP); Hironari Takase, Osaka (JP); Geun-Bae Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 653 days.

(21) Appl. No.: 12/332,218

(22) Filed: Dec. 10, 2008

(65) Prior Publication Data
US 2009/0155677 A1    Jun. 18, 2009

(30) Foreign Application Priority Data

Dec. 11, 2007 (JP) ................................. 2007-320007
Dec. 11, 2007 (JP) ................................. 2007-320008

(51) Int. Cl.
| | | |
|---|---|---|
| H01M 2/16 | (2006.01) | |
| H01M 2/18 | (2006.01) | |
| H01M 10/052 | (2010.01) | |

(52) U.S. Cl.
CPC ............ *H01M 2/166* (2013.01); *H01M 2/1653* (2013.01); *H01M 2/1673* (2013.01); *H01M 2/1686* (2013.01); *H01M 2/18* (2013.01); *H01M 10/052* (2013.01)
USPC .......................................... 429/144; 429/251

(58) Field of Classification Search
None
See application file for complete search history.

(56) References Cited

U.S. PATENT DOCUMENTS

| | | | |
|---|---|---|---|
| 3,880,672 A * | 4/1975 | Megahed et al. ............. | 429/206 |
| 4,650,730 A | 3/1987 | Lundquist et al. | |
| 6,080,507 A * | 6/2000 | Yu .................................... | 429/62 |
| 6,444,359 B1 | 9/2002 | Satoh et al. | |
| 6,730,440 B1 * | 5/2004 | Bauer et al. .................... | 429/249 |
| 7,279,251 B1 | 10/2007 | Yun et al. | |
| 2002/0034689 A1* | 3/2002 | Hoshida et al. ............... | 429/254 |
| 2003/0072996 A1* | 4/2003 | Roh ............................... | 429/144 |
| 2005/0186479 A1 | 8/2005 | Totsuka et al. | |

(Continued)

FOREIGN PATENT DOCUMENTS

| | | |
|---|---|---|
| CN | 1661829 A | 8/2005 |
| CN | 101048892 A | 10/2007 |

(Continued)

OTHER PUBLICATIONS

SIPO Office action dated Jun. 13, 2010, for corresponding Chinese Patent application 200810185104.9, with English translation, noting listed reference in this IDS.

(Continued)

*Primary Examiner* — Jonathan Crepeau
(74) *Attorney, Agent, or Firm* — Christie, Parker & Hale, LLP

(57) ABSTRACT

A separator for non-aqueous rechargeable lithium batteries and a non-aqueous rechargeable lithium battery including the separator are provided. The separator includes a separator body and a composite including an organic compound and an inorganic compound supporting the separator body, where the organic compound has a higher melting point than that of the material composing the separator body, and the inorganic compound includes an element selected from the group consisting of 1A, 2A, 3A, 4A, 3B, and 5B elements from the periodic table, and combinations thereof, and at least one moiety selected from the group consisting of oxides, hydroxides, carbonates, phosphates, sulfates, nitrates, alkoxides, and combinations thereof.

20 Claims, 2 Drawing Sheets

(56) References Cited

U.S. PATENT DOCUMENTS

| | | |
|---|---|---|
| 2007/0048607 A1 | 3/2007 | Nakashima et al. |
| 2007/0264577 A1 | 11/2007 | Katayama et al. |
| 2007/0281206 A1 | 12/2007 | Fujikawa et al. |
| 2012/0135317 A1 | 5/2012 | Nakashima et al. |

FOREIGN PATENT DOCUMENTS

| | | | |
|---|---|---|---|
| CN | 101276895 | * | 10/2008 |
| EP | 0 982 790 A1 | | 3/2000 |
| EP | 1 146 576 A1 | | 10/2001 |
| JP | 2003-533862 A | | 11/2003 |
| JP | 2005-259680 | | 9/2005 |
| JP | 2005-327680 | | 11/2005 |
| JP | 2007-95344 | | 4/2007 |
| JP | 2007-214137 | | 8/2007 |
| JP | 2007-273443 | | 10/2007 |
| JP | 2007-531234 | | 11/2007 |
| JP | 2007-324073 A | | 12/2007 |
| KR | 10-0321264 B1 | | 1/2002 |
| KR | 10-0362361 B1 | | 11/2002 |
| KR | 2003-0030686 | | 4/2003 |
| WO | WO 2006/061936 A1 | | 6/2006 |
| WO | WO 2008/018656 | * | 2/2008 |
| WO | WO 2008/038971 | * | 4/2008 |
| WO | WO 2008/149895 A1 | | 12/2008 |
| WO | WO 2008/156033 A1 | | 12/2008 |

OTHER PUBLICATIONS

KIPO Notice of Allowance dated Oct. 25, 2010 for corresponding Korean Patent application 10-2008-0112793.

Patent Abstracts of Japan and English machine translation of Japanese Publication 2007-214137.

SIPO Office action dated Jun. 2, 2011 in corresponding Chinese Patent Application No. 200810185104.9, together with English translation, 8 pages.

SIPO Certificate of invention patent dated Dec. 21, 2011 for ZL 2008 1 0185104.9 (14 pages).

Patent Abstracts of Japan, and English machine translation of Japanese Publication 2007-273443 (24 pages).

European Search Report dated Aug. 6, 2012, for corresponding European Patent application 08253971.9, (8 pages).

English Machine Translation of JP 2007-324073 A, 21 pages.

* cited by examiner

SEPARATOR FOR NON-AQUEOUS RECHARGEABLE LITHIUM BATTERY

CROSS-REFERENCE TO RELATED APPLICATION

This application claims priority to and the benefit of Japanese Patent Applications Nos. 2007-320007 and 2007-320008, both filed in the Japanese Patent Office on Dec. 11, 2007, the entire content of each of which is incorporated herein by reference.

BACKGROUND OF THE INVENTION

1. Field of the Invention

The present invention relates to a separator for a non-aqueous rechargeable lithium battery.

2. Description of the Related Art

Conventional non-aqueous rechargeable lithium batteries have a separator including an electrically insulating porous film between a positive electrode and a negative electrode, and an electrolyte solution in which dissolved lithium salt is impregnated in the film pores. Such a non-aqueous rechargeable lithium battery has excellent characteristics such as high capacity and high energy density.

The positive electrode or the negative electrode of conventional non-aqueous rechargeable lithium batteries has an active material of a transition metal compound. For example, when the positive active material includes a Li—Co-based oxide, such as $LiCoO_2$, trivalent cobalt ions ($Co^{3+}$) are converted to an unstable quadrivalent cobalt ions ($Co^{4+}$) by the intercalation reactions of lithium ions during the charge and discharge cycles. The quadrivalent cobalt ions then react with an electrolyte solution to oxidize the electrolyte solution and are reduced to divalent cobalt ion ($Co^{2+}$). The divalent cobalt ions tend to dissolve in the electrolyte solution, and move to the negative electrode, where they are reduced and precipitated as cobalt metal. When the cobalt metal is deposited and accumulated in the negative electrode, the separator and/or the negative electrode may get damaged and the charge and discharge characteristics of the non-aqueous rechargeable lithium battery may also deteriorate accordingly.

In addition, when the quadrivalent cobalt ions are reduced to divalent cobalt ions, the separator may also oxidize and deteriorate. For example, when a separator is composed of polyethylene, the hydrogen atoms are removed by the oxidation reaction, leaving behind only carbons as backbones in the polyethylene molecules. Such a carbonated separator can easily be damaged because of its weak mechanical strength.

As mentioned above, conventional non-aqueous rechargeable lithium batteries have charge and discharge problems because the electrolyte solution decomposition material is deposited on the negative electrode (or positive electrode), and because of the oxidized separator.

Furthermore, due to the high capacity and high energy density in the conventional rechargeable battery, short circuits could occur both inside and outside of the battery, and the battery temperature could rapidly increase. For these reasons, conventional separators typically include a porous film of polyethylene having a melting point ranging from 120 to 140° C. These separators have excellent shutdown characteristic and handling property, and are low in cost.

The shutdown characteristic refers to the core being closed and the current being blocked due to a battery temperature increase from an overcharge or an inside or outside short, so a part of the separator is fused. In other words, as the battery temperature increases, the separator fuses and rapidly contracts, or gets damaged, so the short circuit occurs.

Therefore, in order to improve the safety of the non-aqueous rechargeable lithium battery, it has been attempted to improve the heat resistance of the electrode materials, particularly the separators. Various attempts to improve or ensure battery safety even when the separator is rapidly contracted or damaged have been tried.

Other attempts to improve or ensure battery safety include providing a rechargeable battery mounted with a separator including a heat-resisting nitrogen aromatic polymer and a ceramic powder; a rechargeable battery mounted with a porous film composed of an inorganic oxide filler and a film binder on the surface of a positive electrode or a negative electrode; and a rechargeable battery mounted with a separator including a mixture of a filler having a melting point of 250° C. or more and a filler having a melting point ranging from 80 to 120° C.

However, in such rechargeable batteries, the deterioration of a rechargeable battery due to the transition metal included in the electrode has never been considered.

SUMMARY OF THE INVENTION

An exemplary embodiment of the present invention provides a separator for a non-aqueous rechargeable lithium battery. Another embodiment of the present invention provides a separator for a non-aqueous rechargeable lithium battery that is less prone to deterioration, prevents or reduces short circuits from occurring, and prevents or reduces the deterioration of an electrode by stabilizing the transition elements in the electrode.

A further embodiment of the present invention provides a non-aqueous rechargeable lithium battery including the separator.

The embodiments of the present invention are not limited to the above technical purposes, and a person of ordinary skill in the art can understand other technical purposes.

According to one embodiment of the present invention, a separator for a non-aqueous rechargeable lithium battery is provided. The separator includes a separator body and a composite including an organic compound and an inorganic compound supporting the separator body. The organic compound has a higher melting point than that of the material composing the separator body, and the inorganic compound includes at least one element selected from the group consisting of 1A, 2A, 3A, 4A, 3B, and 5B elements from the periodic table, and combinations thereof, and includes at least one moiety selected from the group consisting of oxides, hydroxides, carbonates, phosphates, sulfates, nitrates, alkoxides, and combinations thereof.

On the surface of the separator body facing the positive electrode and/or the surface facing to the negative electrode, a buffer layer of a composite including the organic compound and the inorganic compound is formed, so that the separator body is supported by the composite.

The separator body is supported by the composite because the composite, which contains the organic compound and inorganic compound, fills the pores of the separator body.

In addition, the buffer layer(s) of the composite including the organic compound and the inorganic compound is formed on the surface of the separator body facing the positive electrode and/or the surface facing the negative electrode, and the composite including the organic compound and inorganic compound fills the pores of the separator body, so that the separator body is supported by the composite.

According to another embodiment of the present invention, a non-aqueous rechargeable lithium battery is provided. The non-aqueous rechargeable lithium battery includes a separator including a separator body and a composite including an organic compound and an inorganic compound supporting the separator body; a positive electrode facing one surface of the separator body; and a negative electrode facing to the other opposite surface. The organic compound has a higher melting point than that of a material of the separator body. The inorganic compound includes at least one element selected from the group consisting of 1A, 2A, 3A, 4A, and 5B elements from the periodic table, and combinations thereof, and includes at least one moiety selected from the group consisting of oxides, hydroxides, carbonates, phosphates, sulfates, nitrates, alkoxides, and combinations thereof.

Further embodiments of the present invention will also be described in detail.

In the separator for the non-aqueous rechargeable lithium battery according to the present invention, it is possible to provide a separator that is less prone to rapid contractions and damage, and accordingly, it is possible to provide a non-aqueous rechargeable lithium battery having an electrode or a separator that is less prone to deterioration after repeated charge and discharge.

DETAILED DESCRIPTION

Figure 1A:
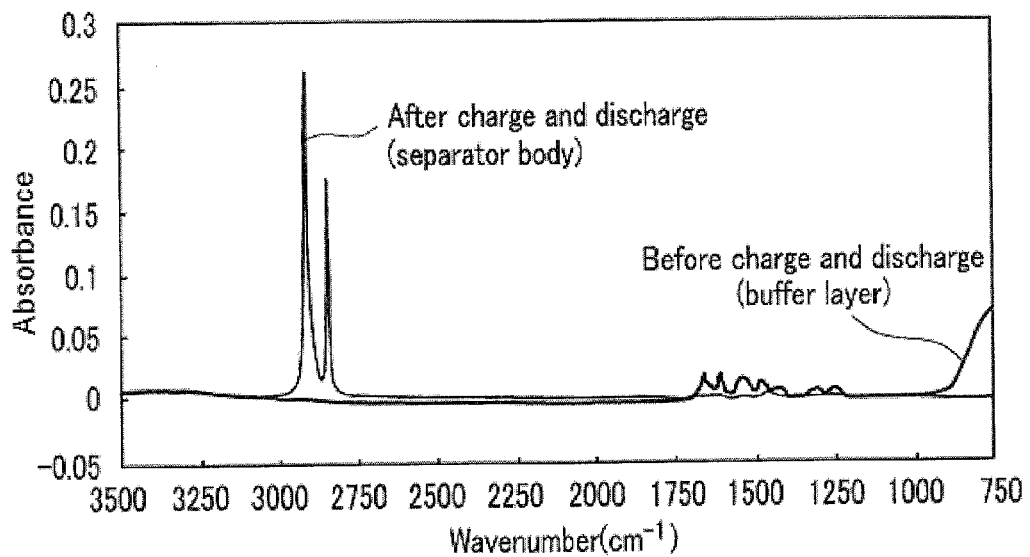
FIG. 1A is a graph showing an FT-IR analysis result of the separator prepared according to Example 2.

Exemplary embodiments of the present invention will hereinafter be described in detail. However, these embodiments are only exemplary, and the present invention is not limited thereto.

Non-aqueous rechargeable lithium batteries, according to various embodiments of the present invention, are provided in shapes of a coin, a button, a sheet, or a cylinder. Alternatively, they can be and have other shapes such as flat or prismatic. These rechargeable batteries include a positive electrode, a negative electrode, an electrolyte, a separator, and so on.

The positive electrode includes an active material of a Li-based-composite oxide of a transition element such as Ti, Mo, W, Nb, V, Mn, Fe, Cr, Ni, Co, and so on; an organic conductive material of a composite sulfide, vanadium oxide, a conjugated polymer, and so on; and a Chevrel phase compound.

The negative electrode includes an active material of a carbon-based active material of graphite, coke, lithium metal, lithium vanadium oxide, lithium transition elements, nitrate, or silicon.

The positive electrode and negative electrode are obtained by mixing the active material with an additive(s) suitably selected from the group consisting of a conductive agent, a binder, a filler, a dispersing agent, an ion conductive agent, and a pressure enhancer.

Suitable conductive agents include graphite, carbon black, acetylene black, KETJEN black, carbon fiber, and metal powder. Suitable binders include polytetrafluoro ethylene, polyfluoride vinylidene, and polyethylene.

In preparing the positive electrode or negative electrode, a mixture of the active material and additives can be added to water or a solvent such as an organic solvent to provide a slurry or a paste. The obtained slurry or paste is coated on an electrode-supported substrate using a doctor blade, and is dried and compressed with a compress roll to provide a positive electrode or a negative electrode.

Suitable electrode-supported substrates include a foil, a sheet, or a net composed of copper, nickel, stainless steel, aluminum, and so on, or a sheet or net composed of carbon fiber. Alternatively, the positive or negative electrode can be formed by compressing the slurry or paste into a pellet-form without using the electrode-supported substrate.

Suitable electrolytes include a non-aqueous electrolyte in which lithium salt is dissolved in an organic solvent, a polymer electrolyte, an inorganic solid electrolyte, a polymer electrolyte, and a composite material with an inorganic solid electrolyte.

Suitable solvents for a non-aqueous electrolyte include cyclic esters such as ethylene carbonate, propylene carbonate, and so on; linear esters such as dimethyl carbonate, diethyl carbonate, methylethyl carbonate, and so on; γ-lactones such as γ-butyl lactone; linear ethers such as 1,2-dimethoxy ethane, 1,2-diethoxy ethane, ethoxymethoxy ethane, and so on; cyclic ethers such as tetrahydrofurans; and nitriles such as acetonitrile and so on.

Nonlimiting examples of suitable lithium salts for the non-aqueous electrolyte include $LiAsF_6$, $LiBF_4$, $LiPF_6$, $LiAlCl_4$, $LiClO_4$, $LiCF_3SO_3$, $LiSbF_6$, $LiSCN$, $LiCl$, $LiC_6H_5SO_3$, $LiN(CF_3SO_2)_2$, $LiC(CF_3SO_2)_3$, and $LiC_4P_9SO_3$.

In one embodiment, the separator body is supported by or filled with a composite including an organic compound and an inorganic compound.

The composite may include any other material as long as it can support the separator body. In one embodiment, the composite is coated on the separator body to form a buffer layer of composite on the surface of the separator body facing the positive electrode and/or the surface facing the negative electrode. In addition, the composite fills the pores of the separator body. In other words, one of the buffer layers of the composite is formed on the surface of the separator body facing the positive electrode and another is formed on the surface facing the negative electrode, and the composite also fills the pores of the separator body.

In one embodiment, the buffer layer including the composite is formed on the surface of the separator body facing the positive electrode and/or the surface facing the negative electrode. The buffer layer can absorb the volume change created by the expansion and contraction of the electrode during the charge and discharge cycles. Accordingly, the buffer layer can suppress electrode deterioration due to the reactions of the electrode with the separator body.

Even though the transition element ions included in the positive electrode or the negative electrode are not stable because of the intercalation of lithium ions during the charge and discharge cycles with the positive electrode or negative electrode, the metal ions produced from the inorganic compounds, which are decomposed and eluted in the electrolyte solution, can capture, trap, and stabilize the transition element ions. This stabilization process occurs because the separator body is supported by a composite that has the inorganic compound. Therefore, the separator for a non-aqueous rechargeable lithium battery, according to an embodiment of the present invention, can prevent the deterioration of the electrode due to the electrolyte deposition. One example of an electrolyte deposition includes Li electrodeposition (electrolysis deposition) on the electrode created from a reaction of the positive electrode or negative electrode and the electrolyte solution. The separator can also prevent its own deterioration due to fewer reactions with the positive electrode or negative electrode.

Some of the reactions will now be described in detail along with specific examples. When the active material of the positive electrode is $LiCoO_2$ and the inorganic compound is $Al(OC_2H_5)_3$, the transition element ions (Co ions) in the positive electrode material produce unstable quadrivalent cobalt ions ($Co^{4+}$). At the same time, some of the Al included in the inorganic compound decompose and elute as ionized $Al^{3+}$ to the electrolyte solution. The $Al^{3+}$ ions bound with $Co^{2+}$ ions (by reducing the $Co^{4+}$ ions) in the electrolyte solution to generate Co—Al compounds, which deposit on the surface of the positive electrode and thereby stabilize the surface.

The separator body may include a porous film composed of a polyolefin such as polypropylene or polyethylene, or a porous material such as a glass filter, a non-woven fabric, and so on. In one embodiment, the separator includes a porous film composed of polyethylene having a melting point ranging from 120 to 140° C. Polyethylene films may be advantageous because they have excellent shutdown characteristics and handling property and are beneficial in terms of cost.

According to one embodiment, the separator body has porosity ranging from 40 to 90 volume %. In another embodiment, the separator body has porosity ranging from 50 to 80 volume %.

When the separator body has porosity ranging from 40 to 90 volume %, the ionic conductivity of the separator increases, so the high discharge characteristic of the non-aqueous rechargeable lithium battery improves. The mechanical strength of the separator also increases and thereby is less prone to damage.

The separator body may have a thickness of 60 μm or less. In one embodiment, the thickness of the separator body ranges from 10 to 30 μm. When the separator body has a thickness of 60 μm or less, the energy density of the non-aqueous rechargeable lithium battery improves.

In one embodiment, the organic compound included in the composite has a higher melting point than that of the material of the separator body. That is, the melting point of the organic compound is 180° C. or more. In one embodiment, the melting point of the organic compound ranges from 180 to 700° C. In another embodiment, the melting point of the organic compound ranges from 250 to 700° C.

When the organic compound has a melting point of 180° C. or more, the separator structure can be maintained even when the separator body is fused, so short circuits can be prevented.

Nonlimiting examples of suitable organic compounds may include an aromatic polyamide (hereinafter referred to as "aramid") selected from the group consisting of polypropylene, poly(phenylene terephthalamide), poly(benzamide), poly(4,4'-benzanilideterephthalamide), poly(phenylene-4,4'-biphenylene dicarbonic acid amide), poly(phenylene-2,6-naphthalene dicarbonic acid amide), poly(2-chlorophenylene terephthalamide), and phenylene terephthalamide/2,6-dichlorophenylene terephthalamide copolymers. The optical property of the aramid can be meta or para.

The inorganic compound included in the composite includes at least one element selected from the group consisting of 1A, 2A, 3A, 4A, 3B, and 5B elements from the periodic table, and combinations thereof, and one moiety selected from the group consisting of oxides, hydroxides, carbonates, phosphates, sulfates, nitrates, alkoxides, and combinations thereof.

Nonlimiting examples of suitable inorganic compounds include $MgCO_3$, $BaCO_3$, $Li_2CO_3$, $Al(OH).NH_2O$, $Al_2(SO_4)_3$, $MgSO_4$, $Al(OC_2H_5)_3$, $YPO_4$, $(ZrO)_2P_2O_7$, $ZrP_2O_7$, $Al(NO_3)_3$, $Al_2(SO_4)_3.Al(OC_2H_5)_3$, $LiAlO_2$, $LiAl_5O_8$, $Li_5AlO_4$, $MgO$, $MgAl_2O_4$, $BaTiO_3$, $CoAl_2O_4$, $Li_2SiO_4$, $Li_2B_4O_7$, $Li_2MoO_3$, $Al(OH)_3$, $AlPO_4$, $Mg(OH)_2$, $Al_2O_3.AlPO_4$, $Li_2ZrO_3$, and $Al_2O_3.Al(OH)_3$. The inorganic compound may be used singularly or as a mixture. The inorganic compound can be mixed with a secondary inorganic compound. Nonlimiting examples of suitable secondary inorganic compounds include $AlPO_4$, $Al_2O_3$, $Al(OH)_3$, $Mg(OH)_2$, $ZrO$, $SiO_2$, and so on.

In various embodiments, the composites including the organic compound and inorganic compound are porous and have a plurality of pores.

In one embodiment, the buffer layer has porosity ranging from 40 to 90 volume %. In another embodiment, the buffer layer has a porosity ranging from 50 to 90 volume %. In a further embodiment, the porosity ranges from 40 to 60 volume %.

If the buffer layer has porosity ranging from 40 to 90 volume %, the cushion property improves, so it is possible to absorb the volume change due to the expansion and contraction of the electrode during the charge and discharge cycles. As a result, the electrode is less prone to damage since it has improved mechanical strength.

In one embodiment, the buffer layer has a thickness (on one side) of 2 μm or more. In another embodiment, the buffer layer has a thickness ranging from 2 to 20 μm. In a further embodiment, the buffer layer has a thickness ranging from 2 to 10 μm.

When the buffer layer has a thickness of 2 μm or more, it is possible to absorb the volume change created by to the expansion and contraction of the electrode during the charge and discharge cycles. Because of sufficient reinforcement on the separator body, the separator backbone is maintained to prevent short circuits even after the battery temperature is increased and the separator body is fused. If further safety features for the rechargeable battery are desired, the buffer layer can be made thicker.

The weight amount of the organic compound of the composite may range from 5 to 50 wt % based on the total weight of the organic compound and inorganic compound. The weight amount of the inorganic compound may range from 50 to 95 wt %. In one embodiment, the amount of the organic compound is 10 to 30 wt % and the amount of the inorganic compound is 70 to 90 wt %. In another embodiment, the amount of the organic compound is 15 to 25 wt % and the amount of the inorganic compound is 75 to 85 wt %.

When the inorganic compound is included at 50 to 95 wt %, it is possible to sufficiently stabilize the included transition elements because the inorganic compound is sufficiently added and the intensity is improved. Furthermore, when the separator is mounted in the rechargeable battery, it is difficult for it to deteriorate.

The method of preparing the buffer layer is not limited as described, or as discussed hereafter, but rather is illustrative of how a buffer layer can be prepared.

When the aramid is used as an organic compound, the aramid is dissolved in a polar organic solvent such as N,N-dimethylformamide, N,N-dimethyl acetamide, N-methyl-2-pyrrolidone, tetramethyl urea, and so on.

Subsequently, an inorganic compound is dispersed in a polar organic solution to provide a slurry solution. The slurry solution is coated on the surface of the separator body.

The slurry solution is cured or attached to the surface of the separator body under a certain or set humidity level and at 20° C. or more. The aramid dispersed in the inorganic compound precipitates on the surface of the separator body. The separator is immersed in a curing solution including an aqueous solution, polar organic solvent, or an alcoholic solution. The polar organic solvent is then evaporated and removed from the surface of the separator.

The separator from which the polar organic solvent is removed is dried at a melting point temperature of the separator body to provide a separator formed with a buffer layer on the body surface.

The present invention is not limited by the following illustrated examples.

In various examples, the separator body is supported by a buffer layer of composite formed on the surface of the separator body. However, the non-aqueous rechargeable lithium battery according to one embodiment of the present invention can be modified such that the buffer layer including the composite is formed on the surface of the electrode, or it can be placed between the separator body and the negative electrode or the positive electrode by being supported by an electrode-supported substrate independent from the separator body or the electrode.

Figure 2:
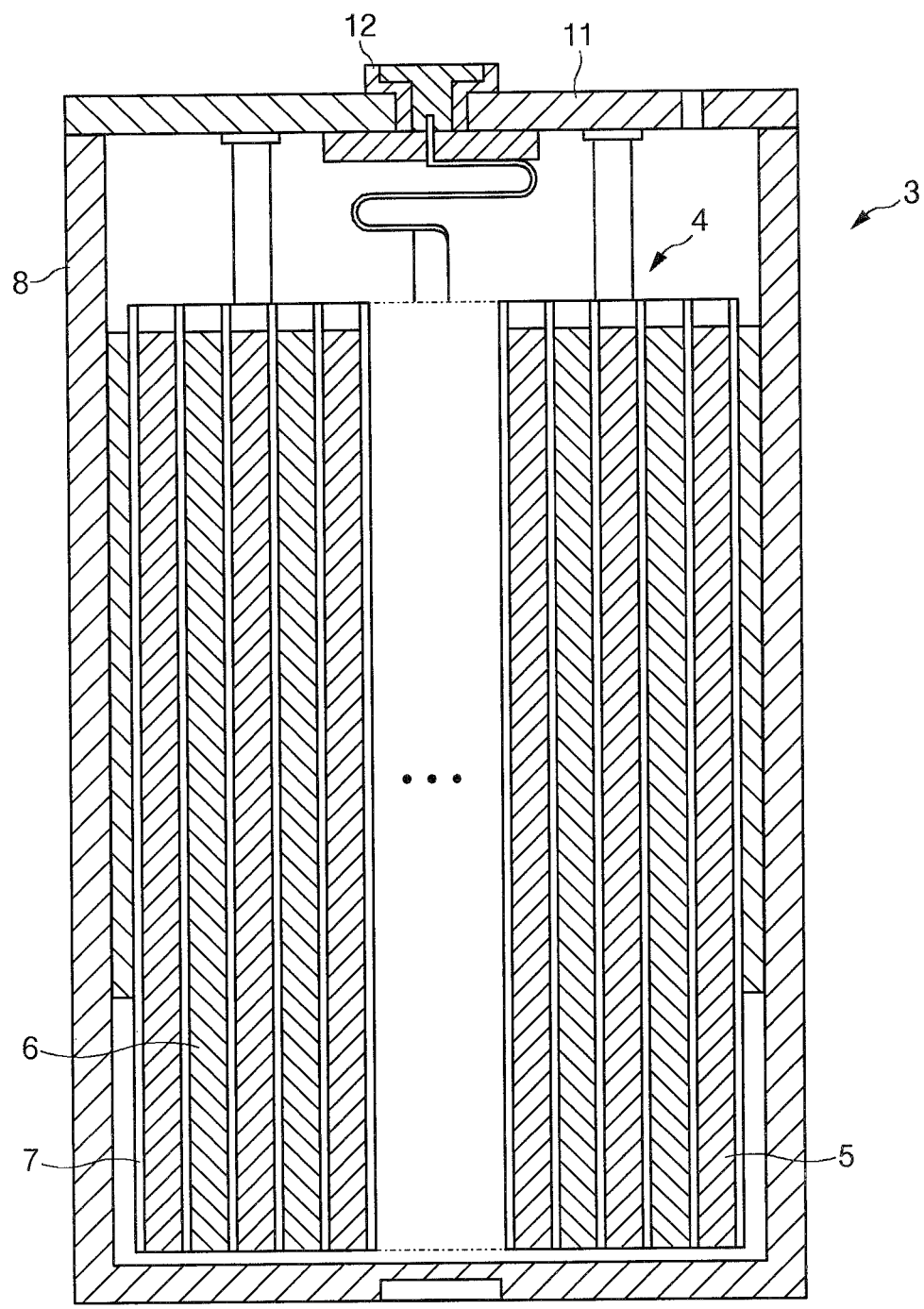
FIG. 2 is a cross-sectional view of a battery according to on one embodiment of the present invention.

As shown in FIG. 2, the lithium battery 3 includes an electrode assembly 4 including a cathode 5, an anode 6, and a separator 7 positioned between the cathode 5 and anode 6. The electrode assembly 4 is housed in a battery case 8, and sealed with a cap plate 11 and sealing gasket 12. An electrolyte is then injected into the battery case to complete the battery.

It is to be understood that various embodiments of the present invention may include parts or all of the illustrated examples and modifications thereof. These examples, however, should not in any sense be interpreted as limiting the scope of the present invention.

EXAMPLES

Examples 1 to 9

3 parts by weight of N-methyl-2-pyrrolidone solution in which a binder of polyvinylidene fluoride (manufactured by GURYE CHEMICAL CO., LTD. #1100) was dissolved, 95 parts by weight of $LiCoO_2$, and 2 parts by weight of conductive carbon were mixed to provide a positive electrode slurry. The positive electrode slurry was uniformly coated on a 15 μm-thick Al-foil, and dried to provide a positive electrode. The weight ratio of $LiCoO_2$:conductive carbon:polyvinylidene fluoride was 95:2:3.

A mixture of lithium vanadium oxide (LVO) powder and carbon material powder was used as a negative active material. 90 parts by weight of the mixture was mixed with 10 parts by weight of a polyvinylidene fluoride as a binder, and dispersed in N-methyl-2-pyrrolidone to provide a negative electrode slurry. The negative electrode slurry was uniformly coated on a 20 μm-thick copper foil and dried to provide a negative electrode.

A polyethylene separator having a buffer layer of a composite, which includes a meta-aramid polymer as an organic compound and other various inorganic compounds shown in Table 1 (for Examples 1 to 9) at a weight ratio of 15:85, coated on each surface of the separator 4 μm thick was interposed between the positive electrode and the negative electrode. A 18650-type cylinder rechargeable lithium cell was provided by injecting a non-aqueous electrolyte solution of $LiPF_6$ dissolved in a mixed solvent, which includes ethylene carbonate and diethyl carbonate at a 3:7 weight ratio, at a concentration of 1.50 mol/L.

Comparative Examples

A polyethylene separator (without a buffer layer) was interposed between a positive electrode and a negative electrode, both of the positive electrode and negative electrode were prepared according to the same procedure as above, and a 18650-type cylinder rechargeable lithium cell was provided using the same above described method.

Analyzing Capacity Retention Characteristic

Each of non-aqueous rechargeable lithium cells prepared according to Examples 1 to 9 and comparative example was charged at a constant current of 0.5 C and constant voltage of 4.3V, and were then discharged to a discharge end voltage of 2.75V at 0.5 C, and repeated for 200 cycles. The capacity retention ratio was measured after completing the 200 cycles and the results are provided in Table 1.

TABLE 1

| | Inorganic compound | Separator body thickness (μm) | Thickness of one buffer layer (μm) | Capacity retention (%) |
|---|---|---|---|---|
| Example 1 | $Al_2(SO_4)_3$ | 20 | 4 | 92 |
| Example 2 | $Al_2(SO_4)_3 \cdot Al(OC_2H_5)_3$ | 20 | 4 | 88 |
| Example 3 | $MgCO_3$ | 20 | 4 | 85 |
| Example 4 | $BaCO_3$ | 20 | 4 | 88 |
| Example 5 | $Al_2O_3 \cdot AlPO_4$ | 20 | 4 | 92 |
| Example 6 | $MgAl_2O_4$ | 20 | 4 | 85 |
| Example 7 | $Li_2ZrO_3$ | 20 | 4 | 88 |
| Example 8 | $Li_2SiO_4$ | 20 | 4 | 80 |
| Example 9 | $Al_2O_3 \cdot Al(OH)_3$ | 20 | 4 | 81 |
| Comparative Example | — | 28 | — | 56 |

From the results shown in Table 1, cells having separators with buffer layers of a composite including an organic compound and an inorganic compound formed on both surfaces of the separator body (i.e., Examples 1 to 9) have improved capacity retention after repeating charge and discharge cycles as compared to the cell having only a polyethylene separator (or separator body) interposed between the negative electrode and the positive electrode (i.e., Comparative Example).

Therefore, according to various embodiments of the present invention, even though the charge and discharge was repeated, it was possible to provide a non-aqueous rechargeable lithium battery having a separator that does not deteriorate or is less prone to deterioration. As a result, it is possible to have batteries having improved overall battery characteristics.

Analyzing Cushion Property of Separator

The separator according to Example 5 and the separator according to the Comparative Example were loaded with a 1.0 $kg/cm^2$ weight. The thickness and compression ratio of each case were measured. The results are shown in Table 2.

TABLE 2

| | Thickness without load (μm) | Thickness at load (μm) | Compression ratio (%) |
|---|---|---|---|
| Example 5 | 28 | 19 | 32 |
| Comparative Example | 28 | 26 | 7 |

As shown in Table 2, it is confirmed that the separator of Example 5, which includes a buffer layer on both surfaces, has better compressibility result as compared to that of the separator including only polyethylene according to the Comparative Example. Accordingly, the separator of Example 5 can function as an excellent cushion material when it is disposed between the electrodes.

Assessment by FT-IR

Before and after analyzing the capacity retention characteristics, the separator prepared according Comparative Example was analyzed using FT-IR. The results of the Comparative Example are shown in FIG. 1B.

With respect to the separator prepared according to Example 2, only the buffer layer was analyzed by FT-IR before conducting the capacity retention test; and only the separator body was analyzed by FT-IR after the capacity retention test. The results of Example 2 are shown in FIG. 1A.

Figure 1B:
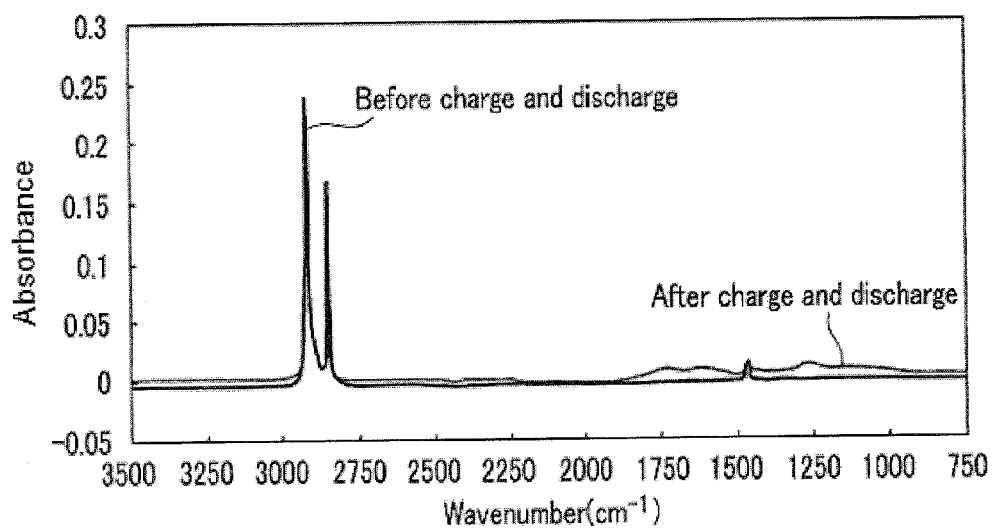
FIG. 1B is a graph showing an FT-IR analysis result of the separator prepared according to a Comparative Example.

As shown in FIG. 1B, hydrogen was released, and the peaks of the unsaturated carbonate and oxide were observed at 1200 to 1800 nm in the separator including only polyethylene of the Comparative Example (See the after charge and discharge FT-IR graph line). In contrast, the polyethylene separator body of Example 2, which has buffer layers on both surfaces, was not oxidized even after the capacity retention test was conducted. (See FIG. 1A, the after charge and discharge separator body FT-IR graph line, the line is relatively flat in the 1200-1800 nm region.) Accordingly, it is confirmed that oxidation and thereby the deterioration of the separator body was suppressed by the buffer layer(s).

In addition, according to the results of observing the separator body of the Comparative Example and the separator of Example 2 visually, the separator of the Comparative Example was carbonized and the color changed to black, but the separator body of Example 2 for the most part remained the same.

INDUSTRIAL APPLICABILITY

The present invention can provide a non-aqueous rechargeable lithium battery having improved charge and discharge characteristics as well as safety.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A separator for a non-aqueous rechargeable lithium battery, comprising:
   a separator body comprising a material with a first melting point; and
   a composite supporting the separator body and comprising an organic compound and an inorganic compound, wherein the organic compound has a melting point that is higher than the first melting point, and the inorganic compound comprises a compound selected from the group consisting of $MgAl_2O_4$, $Al_2O_3 \cdot AlPO_4$, $Li_2ZrO_3$, $Al_2O_3 \cdot Al(OH)_3$, and combinations thereof, and wherein the separator body is supported by a buffer layer of the composite on at least one surface of the separator body facing a positive electrode or a negative electrode.

2. The separator of claim 1, wherein the separator body includes a plurality of pores and the separator body is supported by the buffer layer of the composite on at least one surface of the separator body facing a positive electrode or a negative electrode, wherein the pores of the separator body are filled with the composite.

3. The separator of claim 2, wherein the buffer layer has a thickness ranging from 2 to 20 μm.

4. The separator of claim 2, wherein the buffer layer has a porosity ranging from 40 to 90 volume %.

5. The separator of claim 1, wherein the organic compound has a melting point of 180° C. or more.

6. The separator of claim 1, wherein the organic compound comprises at least one compound selected from the group consisting of polypropylene, aromatic polyamides selected from the group consisting of poly(phenylene terephthalamide), poly(benzamide), poly(4,4'-benzanilideterephthalamide), poly(phenylene-4,4'-biphenylene dicarbonic acid amide), poly(phenylene-2,6-naphthalene dicarbonic acid amide), poly(2-chlorophenyleneterephthalamide), phenylene terephthalamide/2,6-dichlorophenylene terephthalamide copolymers, and combinations thereof.

7. The separator of claim 1, wherein the composite comprises 5 to 50 wt % of the organic compound and 50 to 95 wt % of the inorganic compound.

8. The separator of claim 1, wherein the material for the separator body is selected from the group consisting of porous films comprising polypropylene or polyethylene, porous materials comprising glass filters or non-woven fabrics, and combinations thereof.

9. The separator of claim 1, wherein the material for the separator body is a porous film comprising polyethylene having a melting point ranging from 120 to 140° C.

10. The separator of claim 1, wherein the separator body has a porosity ranging from 40 to 90 volume %.

11. A non-aqueous rechargeable lithium battery comprising:
    a separator comprising:
       a separator body comprising a material with a first melting point, and
       a composite supporting the separator body comprising an organic compound and an inorganic compound, wherein the organic compound has a higher melting point than the first melting point, and the inorganic compound comprises a compound selected from the group consisting of $Al_2(SO_4)_3$, $MgAl_2O_4$, $Al_2O_3 \cdot AlPO_4$, $Li_2ZrO_3$, $Al_2O_3 \cdot Al(OH)_3$, and combinations thereof, and wherein the separator body is supported by a buffer layer of the composite on at least one of the first surface or the second surface of the separator body;
    a positive electrode facing a first surface of the separator body; and
    a negative electrode facing a second opposite surface of the separator body.

12. The non-aqueous rechargeable lithium battery of claim 11, wherein the separator body includes a plurality of pores and the separator body is supported by the buffer layer of the composite on at least one surface of the separator body facing the positive electrode or the negative electrode, wherein the pores of the separator body are filled with the composite.

13. The non-aqueous rechargeable lithium battery of claim 12, wherein the buffer layer has a thickness ranging from 2 to 20 μm.

14. The non-aqueous rechargeable lithium battery of claim 12, wherein the buffer layer has a porosity ranging from 40 to 90 volume %.

15. The non-aqueous rechargeable lithium battery of claim 11, wherein the organic compound has a melting point of 180° C. or more.

16. The non-aqueous rechargeable lithium battery of claim 11, wherein the organic compound comprises at least one compound selected from the group consisting of polypropylene, aromatic polyamides selected from the group consisting of poly(phenylene terephthalamide), poly(benzamide), poly(4,4'-benzanilideterephthalamide), poly(phenylene-4,4'-biphenylene dicarbonic acid amide), poly(phenylene-2,6-naphthalene dicarbonic acid amide), poly(2-chlorophenyleneterephthalamide), phenylene terephthalamide/2,6-dichlorophenylene terephthalamide copolymers, and combinations thereof.

17. The non-aqueous rechargeable lithium battery of claim 11, wherein the composite comprises 5 to 50 wt % of the organic compound and 95 to 50 wt % of the inorganic compound.

18. The non-aqueous rechargeable lithium battery of claim 11, wherein the material for the separator body is selected from the group consisting of porous films comprising polypropylene or polyethylene, porous materials comprising glass filters or non-woven fabrics, and combinations thereof.

19. The non-aqueous rechargeable lithium battery of claim 11, wherein the material for the separator body is a porous film comprising polyethylene having a melting point ranging from 120 to 140° C.

20. The non-aqueous rechargeable lithium battery of claim 11, wherein the separator body has a porosity ranging from 40 to 90 volume %.

* * * * *